(12) United States Patent
Pappalardo et al.

(10) Patent No.: US 7,493,473 B2
(45) Date of Patent: *Feb. 17, 2009

(54) METHOD OF EXECUTING INSTRUCTIONS USING FIRST AND SECOND CONTROL UNITS THAT SHARE A STATE REGISTER

(75) Inventors: Francesco Pappalardo, Paterno (IT); Agatino Pennisi, Nocera Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/625,083

(22) Filed: Jan. 19, 2007

(65) Prior Publication Data

US 2007/0245127 A1 Oct. 18, 2007

Related U.S. Application Data

(62) Division of application No. 10/682,378, filed on Oct. 9, 2003, now Pat. No. 7,191,314.

(30) Foreign Application Priority Data

Oct. 11, 2002 (EP) .................................. 02425620

(51) Int. Cl.
*G06F 9/30* (2006.01)
(52) U.S. Cl. .................... 712/208; 712/37; 712/227
(58) Field of Classification Search ........................ None
See application file for complete search history.

(56) References Cited

U.S. PATENT DOCUMENTS

| 5,335,331 A | 8/1994 | Murao et al. |
| 5,729,757 A | 3/1998 | Shekels |
| 5,737,631 A | 4/1998 | Trimberger |
| 5,774,686 A | 6/1998 | Hammond et al. |
| 5,848,289 A | 12/1998 | Studor et al. |
| 6,026,480 A * | 2/2000 | Oowaki et al. ................. 712/37 |
| 6,049,862 A | 4/2000 | Bauer et al. |

(Continued)

FOREIGN PATENT DOCUMENTS

EP 1061437 A1 12/2000

(Continued)

OTHER PUBLICATIONS

Ertem, M., "A Reconfigurable Co-Processor for Microprocessor Systems," in Proceedings of the Southeast Conference, Tampa, Apr. 5-8, 1987, New York, IEEE, vol. 1, pp. 225-228.

(Continued)

*Primary Examiner*—Kenneth S Kim
(74) *Attorney, Agent, or Firm*—Lisa K. Jorgenson; Robert Iannucci; Seed IP Law Group PLLC

(57) ABSTRACT

A method is provided for using a reconfigurable control structure that includes a hard-wired control unit configured to execute a pre-defined instruction set and a programmable control unit configured to execute a programmable instruction set. The method includes associating with each of a plurality of instructions to be executed an operating code to be sent to both the hard-wired control unit and the programmable control unit. The operating code includes at least one bit identifying only one of either the hard-wired control unit or the programmable control unit. The identified control unit is designed to generate control signals for the instruction to be executed.

15 Claims, 4 Drawing Sheets

U.S. PATENT DOCUMENTS 6,092,185 A * 7/2000 Slegel et al. ................ 712/219
6,138,229 A 10/2000 Kucukcakar et al.

OTHER PUBLICATIONS

"Design Flexibility into Hardwired Logic," IBM Technical Disclosure Bulletin 37(3):321-324, Mar. 1994.

Hennessy, J. et al., Computer Organization and Design. The Hardware/Software Interface, Morgan Kaufman Publishers, San Francisco, 1994, Appendix C, "Mapping Control to Hardware," pp. C3-C28.

Jain, R., "An Alternative Approach Towards the Design of Control Units," Microelectronics and Reliability 24 (6):1009-1012, 1984.

"Opcode Compare Facility," Research Disclosure No. 315, Kenneth Mason Publications, p. 577, Jul. 1990.

* cited by examiner

METHOD OF EXECUTING INSTRUCTIONS USING FIRST AND SECOND CONTROL UNITS THAT SHARE A STATE REGISTER

FIELD OF THE INVENTION

The present invention relates to control units for central processing units (CPUs).

DESCRIPTION OF THE RELATED ART

In a CPU, it is generally possible to distinguish two sections referred to as "paths:"
  the path followed by the data (data path), which involves the arithmetic-logic unit (ALU), registers and buses; and
  the path followed by the control signals (control path) to the devices of the data path.

In the context of the control path, selection signals (for operations on the ALU, selection of registers) and timing signals (clock, enabling signals) can moreover be distinguished.

In the above context of application, currently designated by control unit (CU) is a finite state machine designed for coordinating and managing the signal-activation timing sequences according to the types of processing required by the CPU. For each instruction, the control unit guides the CPU through a sequence of control states. In each control state, the control unit sends a set of signals which cause execution of the corresponding micro-operations.

The general scheme of such a control unit is represented in FIG. 1, where the reference CU designates precisely said control unit. Operation of the control unit CU is clocked by a clock signal CLK. The reference F designates, as a whole, the so-called state flags and conditioning flags, whereas the references CS1, CS2 and SB designate, respectively:
  the set of internal control signals to the CPU (not illustrated in the diagram of FIG. 1);
  the control signals on the system bus; and
  the signals coming form the system bus;

The reference IR designates the register where the current instruction is stored.

Again for purposes of general orientation, it is recalled that a finite state machine is a Moore state machine if the combinatorial logic which generates the outputs is only a function of the current state, whereas it is a Mealy state machine if the combinatorial logic that generates the outputs is a function both of the current state and of the inputs.

The solutions adopted for obtaining control units of the type considered previously amount to two fundamental models, i.e.:
  wired-logic solutions; and
  microprogrammed-logic solutions.

The general scheme of a wired-logic control unit is represented in FIG. 2, where the references IR, F, SB and CLK have the same meaning to which reference has already been made previously in the description of FIG. 1.

The core of the control unit represented in FIG. 2 is made up of an encoder block EB basically consisting of a combinatorial-signal generator. The generator in question is designed to receive at input the instructions (decoded by an appropriate instruction decoder ID), the flags F, the control signals SB coming from the system bus SB, as well as the clock signal CLK processed by a module SC designed to function as step counter and decoder, the purpose being to generate at output control signals CS generated according to a typical parallel format.

When the solution described in FIG. 2 is used, once the finite state machine that characterizes the wired-logic control unit has been defined, there follows a step of synthesis of the combinatorial networks required for calculating the outputs CS and the next state of the control unit, starting from the current state and the inputs. The block EB, therefore, basically consists of a circuit made up of flip-flops connected via combinatorial networks, i.e., via more or less complex networks of logic gates.

One of the major critical elements in a structure of this type is linked to the rigidity of the design. A modification of the control policies necessarily affects the design and dimensions of the finite state machine, with a marked incidence on production times and costs thereof.

The diagram of FIG. 3 represents, instead, the basic structure of a microprogrammed-logic control unit. Also in this case, the references IR, F, SB, CLK, and CS indicate the same entities already designated in the same way in FIG. 1 and/or FIG. 2.

In the solution represented in FIG. 3, the current instruction contained in the register IR and the flags F converge towards an address generator AG. The address generator AG operates under the control of a sequencer S, which is clocked by the clock signal CLK and at which there arrive the signals from the system bus SB. The addresses generated by the generator AG reach a microprocessor MPC, the operation of which evolves under the control of an incremental signal INCR coming from the sequencer S. The microprocessor MPC co-operates with a memory MCS, commonly referred to as control memory, in which a microprogram is stored, which defines the sequences of the control signals of the finite state machine. The output from the control memory CS drives a further circuit CB/D, which functions as control buffer/decoder. The circuit CB/D generates the control signals CS that are to be sent to the CPU. In the diagram of FIG. 3, there is also visible an internal address bus, designated by IAB, as well as a line EEF.

The module CB/D transmits on the bus IAB to the generator AG the current state of the control unit, whilst, on the line designated by EEF, it transmits internal control signals indicating the possible end of the instruction END or the end of the fetch step END FETCH or the end of the branch BRANCH.

The versatility of the solution illustrated in FIG. 3 appears evident once it is decided to modify the control policies. Leaving unaltered the combinatorial structure that supervises operation of the finite state machine, by adopting the solution represented in FIG. 3, it is sufficient to act on a microprogram stored in memory to obtain the necessary variations. Furthermore, the design of the circuitry part and the design of the instruction set may be performed in parallel, with savings both in terms of time and in terms of costs.

BRIEF SUMMARY OF THE INVENTION

An embodiment of the present invention provides a reconfigurable control structure which enables amplification and/or modification of the instruction set of a CPU by appropriately programming a memory in which the sequences of states defining the control signals required for execution of a given instruction are stored.

The control structure includes a programmable unit such as will enable the user to define new executable instructions and/or to redefine the basic implemented instructions.

Such an architecture means that the corresponding system will assume the characteristics of an open system: the user can, in fact, define the instruction set that he must use or that a particular application requires. A reconfigurability of this sort renders the microprocessor flexible, enabling the dimensions thereof to be contained, at the same time as the said microprocessor will be able to perform fully the instructions for which it is designed. The control structure thus combines both the advantages of an architecture of a CISC (Complete-Instruction-Set Computer) type, with complex instructions for the required applications, and the advantages of an architecture of the RISC (Reduced-Instruction-Set Computer) type, with a very small control unit.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

Figure 4:
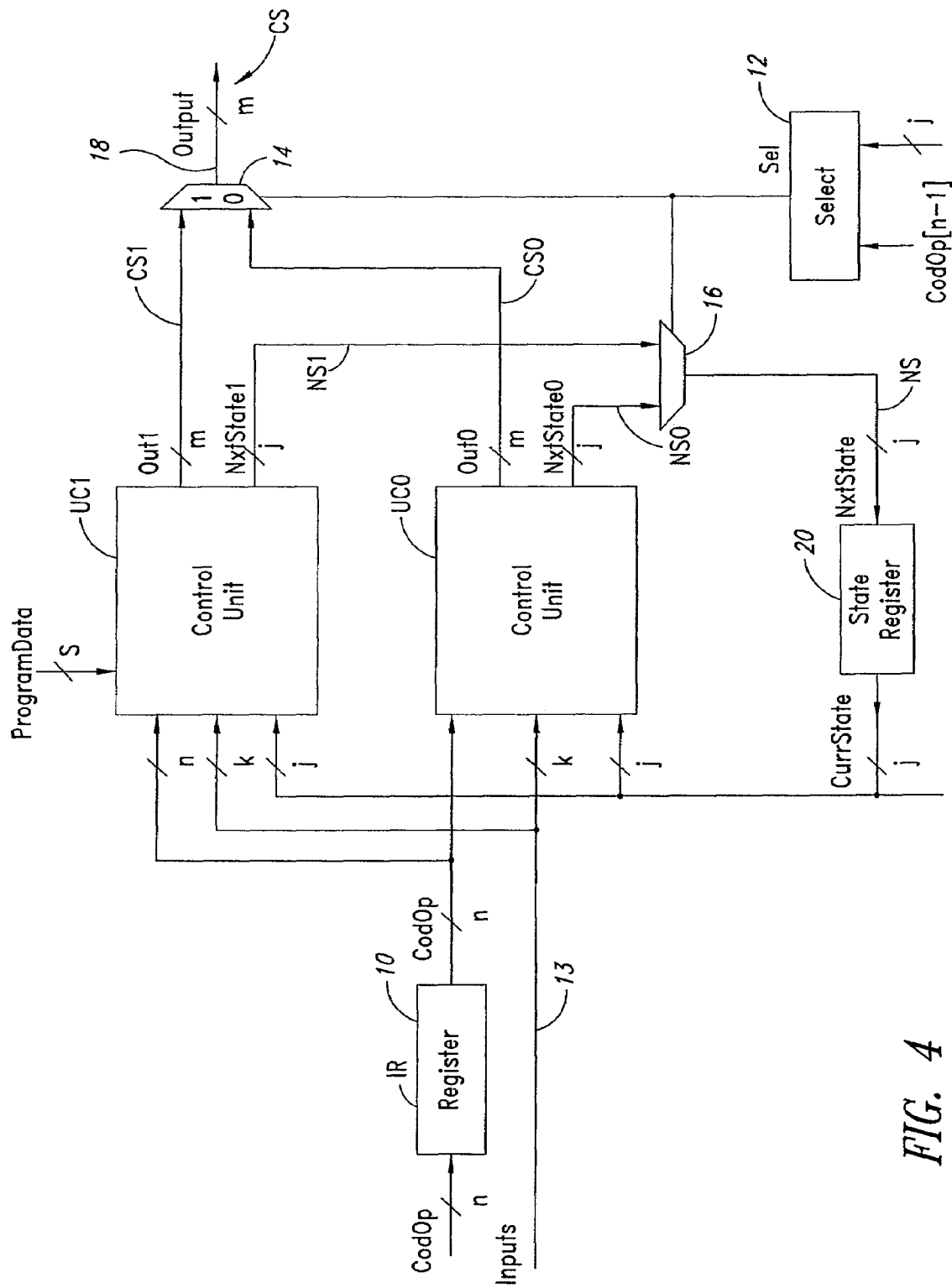
FIG. 4 represents, in the form of a block diagram, a reconfigurable control structure according to the invention.

In the diagram of FIG. 4, the references UC0 and UC1 designate two control units designed to operate in combination with one another.

Figure 2:
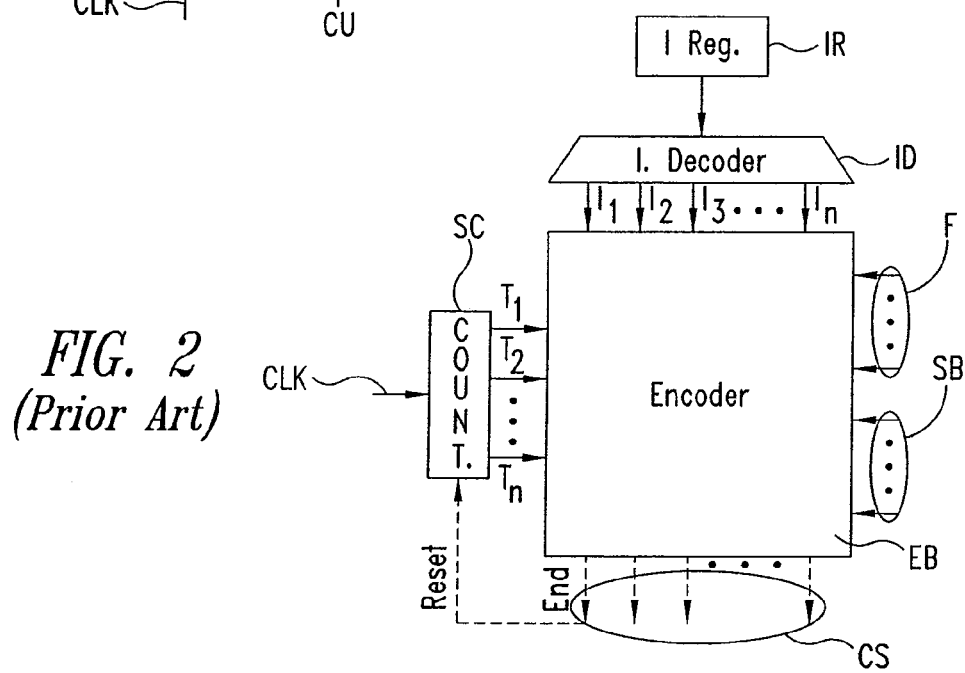

The control unit UC0 is basically a wired-logic control unit, hence having the general structure represented in FIG. 2.

Figure 3:
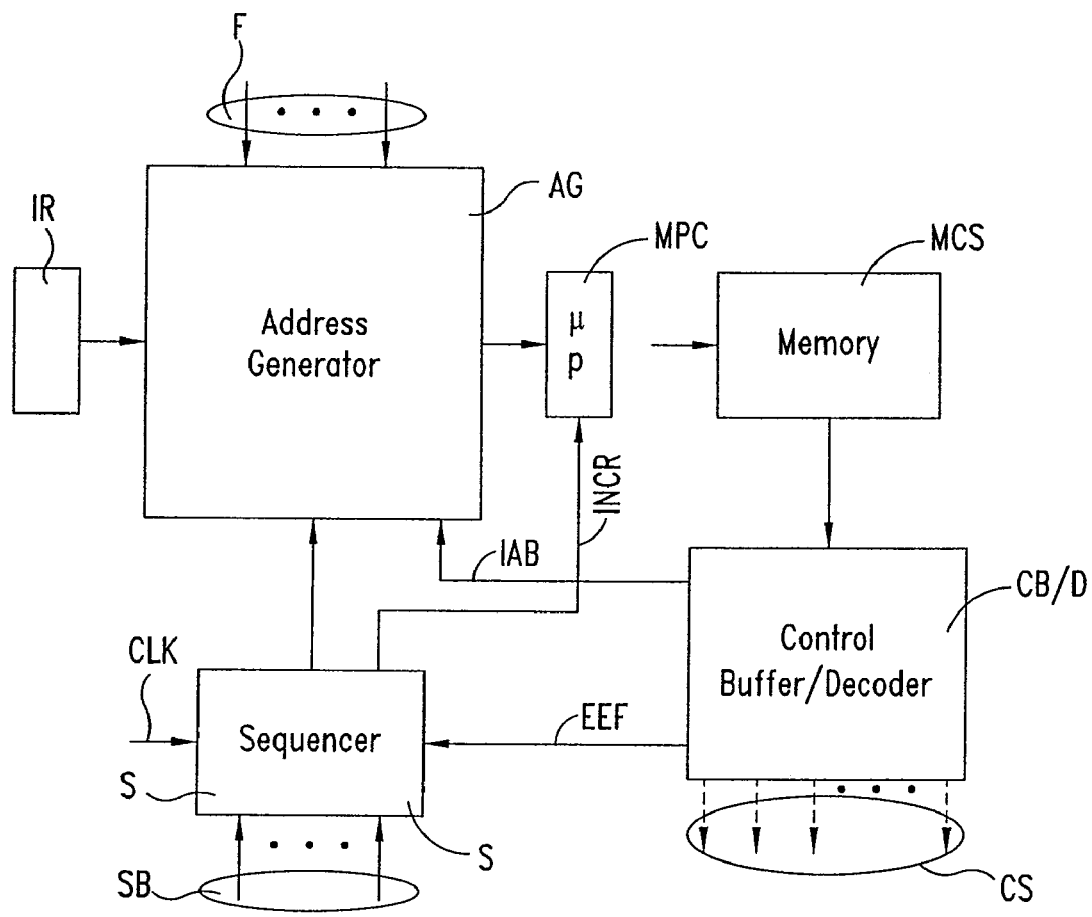

Set alongside the control unit UC0 is the control unit UC1, which corresponds basically to the structure represented in FIG. 3, hence to a programmable control unit.

Figure 1:
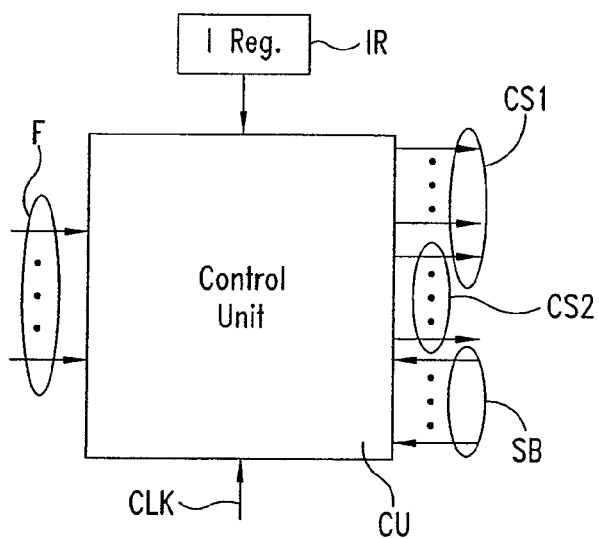
FIGS. 1 to 3, which represent, as a whole, the prior art, have already been described previously.

In this connection, it will be appreciated that the indication "Inputs" which appears in FIG. 4 also includes the conditioning flags designated by F in FIGS. 1, 2 and 3. The operating code of the instruction in the solution described here, is designated in FIG. 4 by CodOp. Consequently, the register 10 of FIG. 4 is, in effect, the analog of the register IR of FIGS. 1, 2 and 3. The term "Input" has been used rather than "Flag" in order to render the description more general. The input signals "Inputs" (state signals, conditioning signals, etc., hereinafter referred to as "Inputs")—which are assumed as being organized as data in parallel format on k bits—are input into both of the units UC0 and UC1.

It is envisaged that the first unit UC0 will implement the control with reference to a basic instruction set (hence, a set that is the same as or smaller than a typical RISC set).

The second unit UC1, since it is programmable, can instead be used both for implementing the same instruction set as the control unit UC0 (for example, for debugging purposes or troubleshooting purposes) and for implementing new more complex instructions (hence, bringing the performance of the assembly practically up to that of a CISC system).

The use of the solution represented in FIG. 4 envisages the construction of an operating code CodOp (in general, on n bits) organized according to the following format:

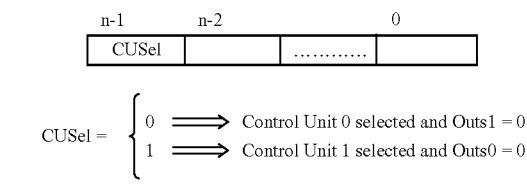

In the format illustrated above, the most significant bit, designated by CUSel, has the task of selecting the unit that generates the control signals for the instructions to be executed.

By means of a register 10 having the function of time memory, the operating code CodOp is sent both to the control unit UC0 and to the control unit UC1.

The n-th bit of the operating code, i.e., CodOp[n−1], which corresponds to the CUSel bit, is sent to a selection circuit 12 designed for driving two multiplexers 14 and 16.

The first multiplexer 14 picks up the outputs of both of the control units UC0, UC1—outputs designated by CS0 and CS1, respectively—and sends, on the output line of the control unit, designated by 18, a signal CS corresponding to the signal CS0 or CS1 according to the unit (UC0 or UC1) selected as unit that is to generate the control signals for the instruction to be executed.

A second multiplexer 16 selects, according to modalities altogether similar, which signal is to be sent to a state register 20 for identifying the state that is to be considered as current state of the system.

Specifically, the multiplexer 16 sends, to the register 20, a state signal NS (in general organized on j bits) chosen from between two homologous signals NS0 and NS1 generated by the unit UC0 and the unit UC1, respectively.

Both the multiplexer 14 and the multiplexer 16 operate according to the output signal Sel generated by the selection circuit 12.

In particular, the multiplexer 16 causes the signal NS to correspond to the state signal generated by the control unit (UC0 or UC1) which, at the moment, is generating the control signals for the instructions to be executed.

The control unit UC0 functions, in general, as a finite state machine of a traditional type. Starting from an initial idle or inactive state IDLE, the operating code of the instruction is received at input: if the instruction in question is found to form part of the basic instruction set, the unit UC0 passes to the next state, executing the instruction; otherwise, the unit UC0 remains in the idle state IDLE leaving the respective outputs at "0".

Operation of the control unit UC1 is, as a whole, similar, except that its instruction set is appropriately programmed by the control unit UC0 by means of an instruction within the basic instruction set dedicated to said function.

Basically, the solution described here envisages duplication of the control unit in the two units UC0 and UC1. The first unit in question, i.e., the unit UC0, is of the hardwired type, i.e., with a definitively fixed structure, according to the criteria commonly adopted in the prior art. Instead, the unit UC1 is programmable and hence flexible. Programming of the latter unit is performed by the unit UC0 by means of appropriate instructions, in practice with a memory-programming operation (step 30 of FIG. 6). For this reason, the programming instruction is included in the basic instruction set.

The table appearing below reproduces the so-called truth table of the selector module 12.

| CodOp[n − 1] | CurrState[j − 1] | CurrState[j − 2] | Sel |
|---|---|---|---|
| 0 | 0 | 000 . . . 0 | 0 |
| 1 | 0 | 000 . . . 0 | 1 |
| — | 0 | ≠0 | 0 |
| — | 1 | ≠0 | 1 |

In the table, the four columns represent, respectively:
the value of the most significant bit of CodOp, namely CodOp[n−1];
the value of the most significant bit of the current state, namely CurrState[j−1];
the value of the other j−1 bits of the current state, namely CurrState[n−2:0]; and
the value of the output signal Sel.

Figure 5:
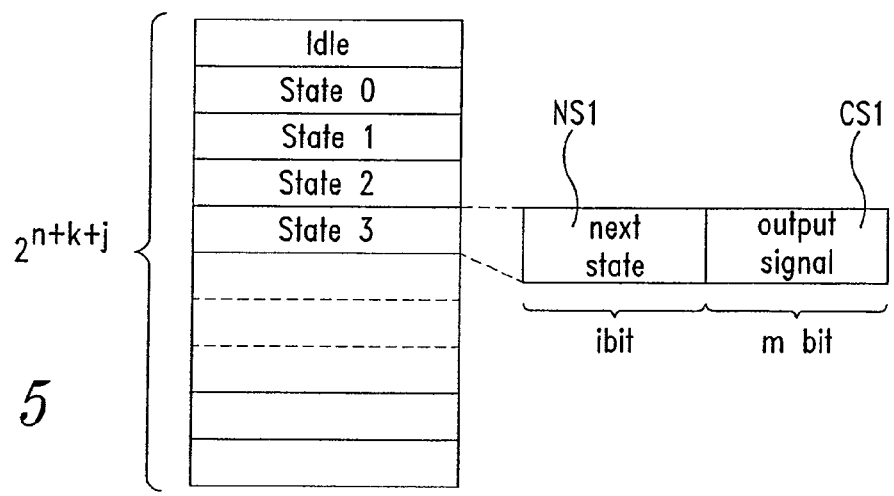
FIG. 5 is a diagram representing the memory of a control unit comprised in a structure according to the invention.

The diagram of FIG. 5 represents the structure of the memory of the control unit UC1, where, at the address 0, there appears the idle state IDLE. The control unit UC1 remains in this state until there arrives at input an operating code and the inputs such that said unit is involved in the generation of output control signals.

In the aforesaid idle state, the respective output lines corresponding to the signal CS1 are kept at "0." In the table of FIG. 5, there are comprised altogether $2^{n+k+j}$ allowed states for the possible machine. Each state is represented by a sequence of j+m bits, in which the first j bits (NS1) identify the next state, whilst the last m bits (CS1) correspond to the corresponding output signal.

In the unit UC1, the number j of state bits is preferably greater than or equal to the number of state bits of the control unit UC0. This makes possible, in the decoding step, total coverage of the states of the control unit UC0 by the control unit UC1.

The proposed solution enables duplication of the instruction set of a CPU simply by programming appropriately the programmable control unit.

Figure 6:
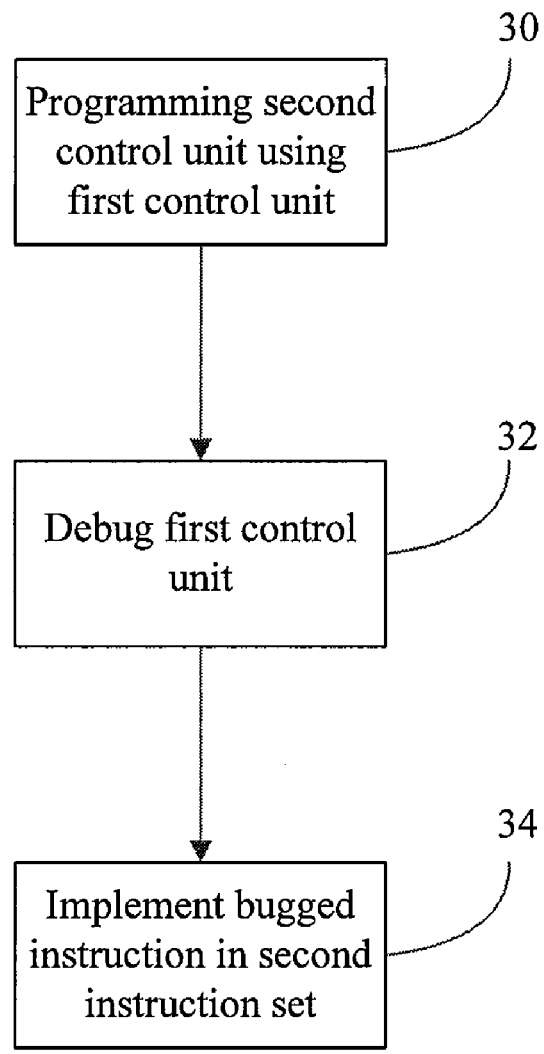
FIG. 6 is a flowchart representing steps of a method of using the control structure.

The solution likewise enables execution of the operation of debugging of the non-programmed control unit (step 32 of FIG. 6, i.e., the unit UC0, with the possibility, in the case where there arise problems on one or more instructions, of deciding to implement the instructions using the programmable unit UC1 (step 34 of FIG. 6).

The same solution also determines an increase in the accessibility of the internal nodes for debugging purposes, likewise enabling generation, for a given instruction, of control signals different from the ones generated by the non-programmable control unit.

Furthermore, the solution also leads to a reduction in the costs of implementation of complex instructions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principle of the invention, the details of implementation and the embodiments may be amply varied with respect to what is described and illustrated herein, purely by way of non-limiting example, without thereby departing from the scope of the present invention, as defined in the claims that follow.

The invention claimed is:

1. A process, comprising:
   using a control structure that includes a first control unit configured to execute a first instruction set; a second control unit configured to execute a second instruction set; and a state register that provides state information to each of the control units, wherein the first control unit includes a first finite state machine, the second control unit includes a second finite state machine, and the second instruction set duplicates, at least in part, the first instruction set, the using including:
   including with each of the instructions to be executed an operating code that includes at least one bit identifying one between the first control unit and the second control unit designed to generate control signals for the instruction to be executed;
   executing a function for debugging the first control unit and, in the event, in the context of the debugging function, of a given instruction not being implementable in a satisfactory way on the first control unit, implementing on the second control unit the instruction not implementable in a satisfactory way on the first control unit;
   recognizing whether a current instruction of the plurality of instructions is to be executed by the first control unit or by the second control unit;
   generating a first state signal from the first control unit;
   generating a second state signal from the second control unit; and
   selectively providing one of the first and second state signals to the state register depending on which of the control units is recognized as being appropriate for executing the current instruction.

2. The process of claim 1, further comprising receiving programming data at the first control unit which uses the programming data to program the second control unit.

3. The process of claim 1, further comprising creating an instruction of the second instruction set utilizing a programming instruction in the first instruction set.

4. A method, comprising:
   using a reconfigurable control structure that includes a hard-wired control unit configured to execute a predefined instruction set, a programmable control unit configured to execute a programmable instruction set, and a state register that provides state information to each of the control units, wherein the hard-wired control unit includes a first finite state machine and the programmable control unit includes a second finite state machine, the using including:
   including with each of a plurality of instructions to be executed an operating code to be sent to both the hard-wired control unit and the programmable control unit, the operating code including at least one bit identifying only one of either the hard-wired control unit or the programmable control unit, the identified control unit being designed to generate control signals for the instruction to be executed;
   recognizing whether a current instruction of the plurality of instructions is to be executed by the hard-wired control unit or by the programmable control unit;
   generating a first state signal from the hard-wired control unit;
   generating a second state signal from the programmable control unit; and
   selectively providing one of the first and second state signals to the state register depending on which of the control units is recognized as being appropriate for executing the current instruction.

5. The method of claim 4, further comprising:
receiving programming data at the hard-wired control unit which uses the programming data to program the programmable control unit.

6. The method of claim 4, further comprising:

selecting, for each of the plurality of instructions to be executed, either the hard-wired control unit or the programmable control unit to generate control signals, the selecting being based on the at least one bit of the operation code.

7. The method of claim 4, further comprising:

creating the programmable instruction set so that the programmable instruction set duplicates, at least in part, the pre-defined instruction set.

8. The method of claim 4, further comprising:

executing a function for debugging the hard-wired control unit and, in the event, in the context of the debugging function, of a given instruction not being implementable in a satisfactory way on the hard-wired control unit, implementing the given instruction on the programmable control unit.

9. A method relating to a reconfigurable control structure that includes a hard-wired control unit configured to execute a pre-defined instruction set, a programmable control unit configured to execute a programmable instruction set, and a state register that provides state information to each of the control units, wherein the hard-wired control unit includes a first finite state machine and the programmable control unit includes a second finite state machine, the method comprising:

programming the programmable control unit using the hard-wired control unit so that the programmable instruction set of the programmable control unit duplicates, at least in part, the pre-defined instruction set of the hard-wired control unit;

debugging the hard-wired control unit;

implementing at least one instruction from the pre-defined instruction set using the programmable control unit if the debugging of the hard-wired control unit indicates a problem with implementing the at least one instruction on the hard-wired control unit;

recognizing whether a current instruction of the plurality of instructions is to be executed by the hard-wired control unit or by the programmable control unit;

generating a first state signal from the hard-wired control unit;

generating a second state signal from the programmable control unit; and selectively providing one of the first and second state signals to the state register depending on which of the control units is recognized as being appropriate for executing the current instruction.

10. The method of claim 9, wherein programming the programmable control unit using the hard-wired control unit comprises utilizing a programming instruction in the pre-defined instruction set.

11. The method of claim 9, further comprising:

including an operating code with each of a plurality of instructions to be executed, wherein the operating code includes at least one bit identifying either the hard-wired control unit or the programmable control unit to generate control signals for the instruction.

12. The method of claim 11, further comprising:

selecting, for each of the plurality of instructions to be executed, either the hard-wired control unit or the programmable control unit to generate control signals, the selecting being based on the at least one bit of the operation code.

13. The method of claim 9, further comprising:

reconfiguring the reconfigurable control structure.

14. The method of claim 13, wherein the reconfiguring of the reconfigurable control structure includes programming the programmable control unit with additional instructions to the programmable instruction set.

15. The method of claim 13, wherein the reconfiguring of the reconfigurable control structure includes programming the programmable control unit with modified instructions to the programmable instruction set.

* * * * *